United States Patent Office 3,081,311
Patented Mar. 12, 1963

3,081,311
SUBSTITUTED DITHIOLANES
William J. Sullivan, Oakland, and Paul H. Williams, Orinda, Calif., assignors to Shell Oil Company, New York, N.Y., a corporation of Delaware
No Drawing. Filed Mar. 21, 1960, Ser. No. 16,175
6 Claims. (Cl. 260—327)

This invention relates to novel substituted dithiolanes and to a method for their preparation. More particularly, it relates to dihydroxy dithiolanes and to their preparation from certain hydroxymercaptoalkanals.

These novel dithiolanes are principally useful as insecticides and may be employed as sprays, dusts or wettable powders. They are also desirable chemical intermediates, particularly in the preparation of linear polyesters by their reaction with dicarboxylic acids to yield long chain high molecular weight materials useful in the preparation of synthetic plastic materials such as fibers, sheets, films, coatings and the like. They may also be oxidized to yield soporific compounds having a structure analogous to that of sulfonal but cyclic.

It is therefore an object of this invention to provide novel dihydroxy dithiolanes and a process for preparing such compounds. Another object is the provision of useful 2,2-disubstituted dihydroxy-1,3-dithiolanes, and still another object is the provision of a process for preparing such compounds by the reaction of alpha-mercapto-beta-hydroxyalkanals with hydrogen sulfide and aldehydes or ketones. Other objects will be apparent from the following description of the invention.

These objects are accomplished in the invention by the dithiolane having the structure

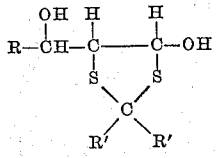

wherein R is an alkyl group having up to 6 carbon atoms and each R' is a monovalent radical selected from the hydrogen atom and lower aliphatic, cycloaliphatic, aryl and aralkyl radicals.

Thus, in the above formula, R may be an alkyl radical such as methyl, ethyl, propyl, isopropyl, butyl, sec-butyl, tert-butyl, amyl or hexyl. Each R' may be lower aliphatic, such as alkyl, e.g., ethyl, propyl, butyl or hexyl; or it may be alkenyl, such as vinyl, allyl, butenyl pentenyl or the like. Alternatively, each R' may be cycloaliphatic, e.g., cycloalkyl, such as cyclopentyl or cyclohexyl; or it may be aryl, such as phenyl, naphthyl, tolyl, xylyl, etc. Similarly, R' may be aralkyl, e.g., benzyl, ethyl phenyl or alpha-cumyl. The R's may be the same or different.

Typical compounds of the type described by the structure are 2,2 - dimethyl - 4 - hydroxy - 5 - (alpha-hydroxypropyl) - 1,3 - dithiolane; 2,2 - diphenyl - 4 - hydroxy - 5 - (alpha-hydroxybutyl) - 1,3 - dithiolane; 2-ethyl - 2 - benzyl - 4 - hydroxy - 5 - hydroxymethyl - 1,3 - dithiolane; 2 - methyl - 2 - ethyl - 4 - hydroxy - 5-(alpha-hydroxyhexyl) - 1,3 - dithiolane; 2 - methyl - 2-vinyl - 4 - hydroxy - 5 - (alpha-hydroxyethyl) - 1,3 - dithiolane; and 2 - cyclohexyl - 2 - methyl - 4 - hydroxy-5-(alpha-hydroxypentyl)-1,3-dithiolane.

Both R's may also be one divalent hydrocarbyl radical wherein each of the bonds attaching the radical to the 2-carbon atom of the dithiolane ring is attached to a different carbon atom. Such a radical may be alkylene, e.g., methylene, ethylene, trimethylene, tetramethylene, pentamethylene, etc., ethylene, propylidene butylidene amylidene; or it may be alkenylene e.g., contain unsaturated linkages. Such dithiolanes have the structure

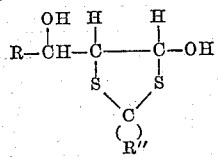

wherein R has the meaning given above and R" is divalent hydrocarbyl. Typical of these compounds are 2 - cyclohexenyl - 4 - hydroxyl - 5 - (alpha-hydroxypropyl) - 1,3 - dithiolane; 2 - pentamethylene - 4 - hydroxy-5 - hydroxymethyl - 1,3 - dithiolane; 2 - cyclopentadienyl-4 - hydroxy - 5 - hydroxyethyl - 1,3 - dithiolane; and 2-cyclopentadienyl - 4 - hydroxy - 5 - (alpha-hydroxyheptyl)-1,3-dithiolane.

Because they have the most insecticidal activity and make polyesters having the most desirable properties, the substituted dithiolanes wherein each R' is alkyl or mononuclear aryl having up to eight carbon atoms are preferred.

The compounds of the invention are readily prepared by reacting together an alpha-mercapto-beta-hydroxy alkanal, preferably having up to 8 carbon atoms, with hydrogen sulfide and a hydrocarbyl carbonyl compound selected from the group consisting of aldehydes and ketones, preferably those having up to 10 carbon atoms. The reaction is most conveniently conducted in liquid phase with the aldehyde or ketone serving as both reactant and solvent.

The alpha-mercapto-beta-hydroxy alkanal reactants are those compounds having the structure

where R is an alkyl group having up to six carbon atoms. Typical alkanal reactants include alpha-mercapto-beta-hydroxybutyraldehyde; alpha-mercapto-beta-hydroxyvaleraldehyde; alpha-mercapto-beta-hydroxyisovaleraldehyde; alpha-mercapto-beta-hydroxycaproaldehyde; alpha-mercapto-beta-hydroxyheptaldehyde and alpha-mercapto-beta-hydroxyoctaldehyde.

These alkanals are reacted with hydrogen sulfide and the aldehyde or ketone by dissolving the alkanal in the carbonylic reactant and bubbling gaseous hydrogen sulfide through the resulting solution. As a consequence, the preferred carbonylic reactants are those which are liquid at or near ordinary temperatures. Suitable aldehydes include acetaldehyde; propionaldehyde; the butyraldehydes; the valeraldehydes; acrolein; crotonaldehyde; benzaldehyde and furfural. Formaldehyde may also be employed if dissolved in an inert solvent.

Suitable ketones include acetone; methyl ethyl ketone; diethyl ketone; diisopropyl ketone; hexanone-2; methyl t-butyl ketone; di-n-amyl ketone; methyl vinyl ketone; cyclopentanone; cyclohexanone; benzophenone; phorone; cyclohexadieneone, and the like.

Most conveniently, both the hydrogen sulfide and the carbonylic reactant are employed in more than stoichiometric proportions so that the ketone or aldehyde may serve as both reactant and solvent, and the hydrogen sulfide may be bubbled through the reaction mixture. However, if desired, the reaction may also be conducted by employing stoichiometric, e.g., equimolar, amounts of the alpha-mercapto-beta-hydroxyalkanal, aldehyde or ketone, and hydrogen sulfide. In such a case use of an inert organic solvent for conduct of the reaction is preferred. Appropriate solvents include such ethers as diethyl ether, methyl ethyl ether, diisopropyl ether, and diamyl ether, and such cyclic ethers as tetrahydrofuran and the dioxanes. Also useful as solvents are such organic liquids as dimethyl formamide and dimethyl sulfide; esters such as butyl and amyl acetate; aromatic solvents such as benzene, toluene, xylene, and anisole; and other conventional organic liquids.

The solvents employed need not be anhydrous and, indeed, it has been found that excellent yields of the product dihydroxy dithiolanes have been obtained when aqueous aldehydes or ketones have been employed. For example, amounts of water in the reaction mixture up to about 20% w., based on the solvent, appear to improve the conduct of the reaction appreciably.

The reaction is conducted in the liquid phase in such solvents and preferably at a temperature below about 50° C. When using the aldehyde or ketone solvents, the convenient temperature range is between about −15° C. and +30° C., while the best yields are obtained at temperatures from about 0° to about 10° C. The reaction may be conducted in substantially neutral solution or, if desired, catalytic amounts of miscible acidic or basic catalysts may be employed.

The dithiolanes of the invention may also be readily prepared from alpha,beta-epoxyalkyl aldehydic compounds by reacting together the aldehyde, hydrocarbyl carbonyl compound and water in the presence of excess hydrogen sulfide. Typical alpha,beta-epoxyalkanals are glycidaldehyde, 2,3-epoxybutanal, 2,3-epoxypentanal, and 2,3-epoxyoctanal. From these alpha,beta-epoxyalkanal compounds the starting alpha-mercapto-beta-hydroxy-alkanals are formed in situ, and then proceed to react further with the hydrogen sulfide and the hydrocarbyl carbonylic reactant to form the desired product. For example, by reacting together at room temperature, aqueous glycidaldehyde and an excess of acetone and hydrogen sulfide, 2,2-dimethyl-4-hydroxymethyl-5-hydroxy-1,3-dithiolane are readily prepared.

To illustrate further the novel products and process of the invention, the following specific examples are set forth. It should be understood, however, that these examples are merely illustrative and are not to be regarded as limitations to the appended claims, since the basic teachings therein may be varied at will as will be understood by one skilled in the art. In the examples, the proportions are expressed in parts by weight unless otherwise noted.

*Example I*

Through a solution of 21.2 g. (0.2 mole) of 2-mercapto-3-hydroxypropionaldehyde dimer in 200 ml. of water and 1000 ml. of acetone was continuously bubbled gaseous hydrogen sulfide for eight hours at room temperature, about 25° C. The saturated solution was allowed to stand four days at room temperature. The solvent was then removed under reduced pressure, and the solid residue dried in a vacuum desiccator. The solid was treated with hot acetone, and the acetone extract dried and concentrated.

In this way, 25.9 g. (71.9% yield) of 2,2-dimethyl-4-hydroxymethyl-5-hydroxy-1,3-dithiolane was obtained. When recrystallized from acetone-ether, the material had a melting point of 112–113° C. and the following composition:

| | C | H | S | M.W. |
|---|---|---|---|---|
| Calculated for $C_6H_{12}O_2S_2$ | 40.0 | 6.7 | 35.5 | 180 |
| Found | 40.0 | 6.7 | 35.3 | 181 |

*Example II*

Employing the method of Example I, alpha-mercapto-beta-hydroxyoctanal is treated in substantially anhydrous diisopropyl ketone with gaseous hydrogen sulfide, the aldehyde and ketone being in 1:2 molar ratio.

In this way, 2,2-diisopropyl-4-hydroxy-5-(alpha-hydroxyhexyl)-1,3-dithiolane is obtained in good yield.

*Example III*

When alpha-mercaptohydracrylaldehyde is treated in 20% aqueous formalin with an excess of hydrogen sulfide at 10° C., as in Example I, 4-hydroxy-5-hydroxymethyl-1,3-dithiolane is obtained in good yield.

*Example IV*

When one mole of alpha-mercapto-beta-hydroxy-pentanal is reacted with hydrogen sulfide in five moles of benzaldehyde, at a temperature of 15° C., employing the method of Example I, the product is 2-phenyl-4-hydroxy-5-(alpha-hydroxypropyl)-1,3-dithiolane.

By employing acetophenone in place of benzaldehyde, the 2 - phenyl - 2 - methyl - 4 - hydroxy - 5 - (alpha-hydroxypropyl)-1,3-dithiolane is obtained.

*Example V*

One mole of alpha-mercaptohydracrylaldehyde and two moles of cyclohexanone are stirred together in water, and through the resulting mixture is bubbled gaseous hydrogen sulfide for four hours at 5° C. The reaction mixture is worked up as in Example I to yield the 4-hydroxy-5-hydroxymethyl-1,3-dithiolane having the structure

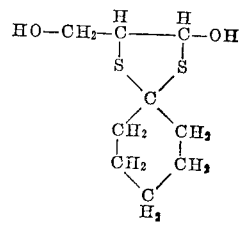

in about 50% yield.

*Example VI*

Reaction of 2.5 moles of methyl vinyl ketone with one mole of alpha-mercapto-beta-hydroxybutyraldehyde and an excess of hydrogen sulfide at 10° C., in the presence of a trace of sulfuric acid, employing the methods and workup of Example I, affords a good yield of 2-methyl-2-vinyl-4-hydroxy-5-(alpha-hydroxyethyl)-1,3-dithiolane.

The 2-vinyl-4-hydroxy-5-(alpha-hydroxyethyl)-1,3-dithiolane is obtained when methyl vinyl ketone is replaced with acrolein.

We claim as our invention:

1. 2,2-dimethyl-4-hydroxy-5-methylol-1,3-dithiolane.
2. The process of preparing 2,2-dimethyl-4-hydroxy-5-methylol-1,3-dithiolane, which comprises reacting together in liquid phase alpha-mercapto-hydracrylaldehyde, hydrogen sulfide, and acetone, and recovering the dithiolane from the reaction mixture.
3. The 1,3-dithiolane selected from the group consisting of dithiolanes of the structure

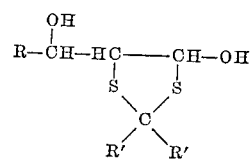

and those of the structure

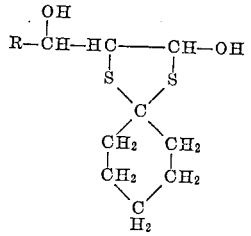

wherein R is alkyl of up to 6 carbon atoms, R' is selected from the group consisting of the hydrogen atom, alkyl of up to 8 carbon atoms, and mononuclear aryl of up to 8 carbon atoms.

4. 2-hydroxy-3-hydroxymethyl-1,4-dithiospirodecane.
5. The 1,3-dithiolane of the structure

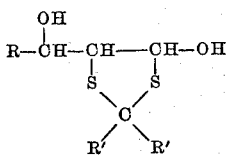

where R is alkyl of up to 6 carbon atoms and each R' is alkyl of up to 8 carbon atoms.

6. The 1,3-dithiolane of the structure

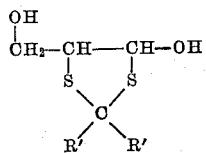

where each R' is alkyl of up to 8 carbon atoms.

References Cited in the file of this patent
UNITED STATES PATENTS

| | | |
|---|---|---|
| 2,432,797 | Peters et al. | Dec. 16, 1947 |
| 2,701,253 | Jones et al. | Feb. 1, 1955 |

OTHER REFERENCES

Stocken: Journal of the Chemical Society (London), 1947, pp. 592–5.

Boekelheide et al.: J. of the Amer. Chem. Soc., vol. 71, pp. 3303–07 (1949).

Royals: Advanced Organic Chemistry, (1956), page 637.

Noller: Chemistry of Organic Compounds, second ed., 1957, p. 278.